United States Patent
Takita et al.

(10) Patent No.: US 8,802,273 B2
(45) Date of Patent: Aug. 12, 2014

(54) MICROPOROUS POLYETHYLENE MEMBRANE, ITS PRODUCTION METHOD, AND BATTERY SEPARATOR

(75) Inventors: Kotaro Takita, Nasushiobara (JP);
Shintaro Kikuchi, Saitama (JP);
Kazuhiro Yamada, Nasushiobara (JP);
Teiji Nakamura, Suginami-ku (JP);
Koichi Kono, Asaka (JP)

(73) Assignee: Toray Battery Separator Film Co., Ltd, Tochigi (JP)

( * ) Notice: Subject to any disclaimer, the term of this patent is extended or adjusted under 35 U.S.C. 154(b) by 288 days.

(21) Appl. No.: 12/066,965

(22) PCT Filed: Sep. 14, 2006

(86) PCT No.: PCT/JP2006/318303
§ 371 (c)(1),
(2), (4) Date: Mar. 14, 2008

(87) PCT Pub. No.: WO2007/032450
PCT Pub. Date: Mar. 22, 2007

(65) Prior Publication Data
US 2009/0269656 A1    Oct. 29, 2009

(30) Foreign Application Priority Data

Sep. 16, 2005 (JP) .............. 2005-271046
Sep. 13, 2006 (JP) .............. 2006-248582

(51) Int. Cl.
*H01M 2/16* (2006.01)
(52) U.S. Cl.
USPC .................................................. 429/145
(58) Field of Classification Search
USPC ........... 429/145; 428/315.5, 315.7; 521/79
See application file for complete search history.

(56) References Cited

U.S. PATENT DOCUMENTS

| | | | |
|---|---|---|---|
| 6,824,865 B1 | 11/2004 | Funaoka et al. | |
| 2005/0058823 A1* | 3/2005 | Funaoka et al. ......... | 428/315.5 |
| 2005/0098913 A1 | 5/2005 | Funaoka et al. | |

FOREIGN PATENT DOCUMENTS

| | | |
|---|---|---|
| EP | 1 153 968 A1 | 11/2001 |
| JP | 02-094356 A | 4/1990 |
| JP | 05-009332 A | 1/1993 |
| JP | 6234875 A | 8/1994 |
| JP | 07-188440 A | 7/1995 |
| JP | 09-012756 A | 1/1997 |
| JP | 2002-194132 A | 7/2002 |

(Continued)

OTHER PUBLICATIONS

Arora et al. "Battery Separators", Chem. Rev. 2004, 104, 4419-4462.*

(Continued)

*Primary Examiner* — Larry Thrower
(74) *Attorney, Agent, or Firm* — Sughrue Mion, PLLC

(57) ABSTRACT

A microporous polyethylene membrane made of a polyethylene resin having a ratio (mass-average molecular weight/number-average molecular weight) of 5 to 300 and comprising 1% or more by mass of ultra-high-molecular-weight polyethylene having a mass-average molecular weight of $7 \times 10^5$ or more, the microporous polyethylene membrane comprising (a) a coarse-structure layer having an average pore diameter of more than 0.04 μm, which is formed on at least one surface, and (b) a dense-structure layer having an average pore diameter of 0.04 μm or less, an area ratio of the coarse-structure layer to the dense-structure layer in a membrane cross section being 0.1 to 0.8.

1 Claim, 1 Drawing Sheet

(56) References Cited

FOREIGN PATENT DOCUMENTS

| JP | 2002-240215 A | 8/2002 |
|---|---|---|
| JP | 2003-010123 A | 1/2003 |
| JP | 2003-020357 | 1/2003 |
| JP | 2003105123 A | 4/2003 |
| WO | 0020492 A1 | 4/2000 |
| WO | WO 00/20492 A1 | 4/2000 |
| WO | WO 00/20493 A1 | 4/2000 |

OTHER PUBLICATIONS

Supplementary European Search Report issued Jan. 17, 2012 in European Patent Application No. 06810147.6.

Korean Intellectual Property Office, "Notification of Grounds of Rejection," issued in connection with Korean Patent Application No. 10-2008-7008877, dated Jul. 26, 2013.

* cited by examiner

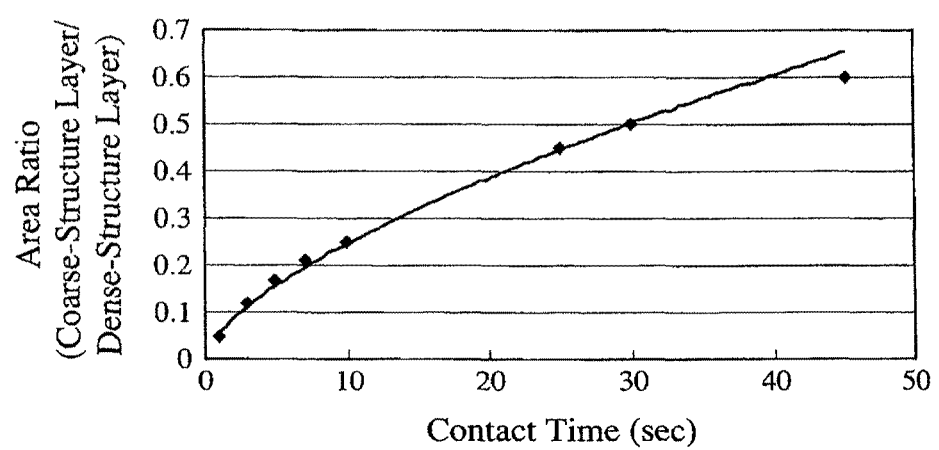

MICROPOROUS POLYETHYLENE MEMBRANE, ITS PRODUCTION METHOD, AND BATTERY SEPARATOR

CROSS REFERENCE TO RELATED APPLICATIONS

This application is a National Stage of International Application No. PCT/JP2006/318303 filed on Sep. 14, 2006, claiming priority based on Japanese Patent Application No. 2005-271046, filed Sep. 16, 2005 and Japanese Patent Application No. 2006-248582 filed Sep. 13, 2006, the contents of all of which are incorporated herein by reference in their entirety.

FIELD OF THE INVENTION

This invention relates to a microporous polyethylene membrane, its production method, and battery separator, particularly to a microporous polyethylene membrane exhibiting small air permeability change and excellent deformability when compressed, and having a high electrolytic solution absorption speed, its production method, and a battery separator.

BACKGROUND OF THE INVENTION

Microporous polyolefin membranes are used in various applications such as battery separators, electrolytic capacitor separators, various filters, steam-permeable, water-proof clothing, reverse osmosis filtration membranes, ultrafiltration membranes, microfiltration membranes, etc. When the microporous polyolefin membranes are used as battery separators, particularly lithium ion battery separators, their performance largely affects the characteristics, productivity and safety of batteries. Accordingly, the microporous polyolefin membranes are required to have excellent permeability, mechanical properties, heat shrinkage resistance, shutdown properties, meltdown properties, etc. For instance, when microporous polyolefin membranes having low mechanical strength are used as battery separators, battery voltage soon becomes low.

To improve the properties of microporous polyolefin membranes, the optimization of starting material compositions, stretching conditions, heat treatment conditions, etc. have been proposed. For instance, JP 2-94356 A proposes a microporous polyethylene membrane for lithium battery separators having good assemblability and low electric resistance, which is produced by melt-blending a high-density polyethylene resin having a mass-average molecular weight (Mw) of 400,000 to 2,000,000 and a molecular weight distribution [mass-average molecular weight/number-average molecular weight (Mw/Mn)] of 25 or less with fine inorganic powder and an organic liquid, extruding the resultant melt blend through a die, cooling the resultant extrudate to provide a gel-like sheet, removing the fine inorganic powder and the organic liquid, and stretching the resultant membrane to 1.5-fold. However, this microporous polyethylene membrane has insufficient strength because of too large surface pore size.

JP 5-9332 A proposes a microporous membrane having high strength and a proper pore size, which is produced by melt-blending ultra-high-molecular-weight polyethylene having a viscosity-average molecular weight of 2,000,000 or more with fine inorganic powder and a plasticizer, extruding the resultant melt blend through a die, cooling the resultant extrudate to provide a gel-like sheet, removing the fine inorganic powder and the plasticizer, drying the resultant membrane, and stretching the membrane only in one direction. However, this microporous membrane also has insufficient strength because of too large surface pore size.

In such circumstances, the applicant proposed a microporous polyolefin membrane made of a polyolefin composition comprising 1% or more by mass of a component having Mw of $7 \times 10^5$ or more, and having Mw/Mn of 10 to 300, whose degree of orientation changes in a thickness direction (Japanese Patent 3347854). This microporous polyolefin membrane having excellent mechanical strength is produced by melt-blending the above polyolefin composition and a membrane-forming solvent, extruding the resultant melt blend through a die, cooling the resultant extrudate to provide a gel-like sheet, stretching the gel-like sheet while heating to provide a temperature distribution in a thickness direction, and removing the membrane-forming solvent.

The applicant also proposed a microporous polyolefin membrane constituted by fine fibrils made of a polyolefin having Mw of $5 \times 10^5$ or more or a polyolefin composition containing such polyolefin, which has an average pore size of 0.05 to 5 μm, the percentage of crystal lamellas having angles θ of 80 to 100° relative to a membrane surface being 40% or more in each longitudinal or transverse cross section (WO 2000/20492). This microporous membrane having excellent permeability is produced by melt-blending 10 to 50% by mass of the above polyolefin or polyolefin composition with 50 to 90% by mass of a membrane-forming solvent, extruding the resultant solution through a die, cooling the resultant extrudate to provide a gel-like sheet, stretching the gel-like molding, if necessary, heat-setting the resultant membrane at a temperature in a range from the crystal dispersion temperature of the polyolefin or polyolefin composition to its melting point +30° C., and removing the membrane-forming solvent.

The applicant also proposed a microporous polyolefin membrane made of a polyolefin having Mw of $5 \times 10^5$ or more or a polyolefin composition containing such polyolefin, in which an average pore size gradually decreases from at least one surface to a center in a thickness direction (WO 2000/20493). This microporous membrane having excellent permeability is produced by melt-blending 10 to 50% by mass of the above polyolefin or polyolefin composition with 50 to 90% by mass of a membrane-forming solvent, extruding the resultant solution through a die, cooling the resultant extrudate to provide a gel-like sheet, and bringing the gel-like sheet into contact with a hot solvent and then removing the membrane-forming solvent, or removing the membrane-forming solvent from the gel-like sheet and then bringing the resultant membrane into contact with a hot solvent.

However, recently gaining importance as separator characteristics are not only permeability and mechanical strength, but also battery life properties such as cycle properties and battery productivity properties such as electrolytic solution absorbability. Particularly a lithium ion battery electrode expands by the intrusion of lithium when charged, and shrinks by the departure of lithium when discharged, an expansion ratio when charged tending to become larger as recent increase in the capacity of batteries. Because a separator is compressed when the electrode expands, the separator is required to be deformable to absorb the expansion of an electrode while suffering only small variation of permeability by compression. However, any microporous membrane described in the above references does not have sufficient compression resistance. A microporous membrane with poor compression resistance is highly likely to provide batteries with insufficient capacity (poor cycle properties) when used as a separator.

Poor electrolytic solution absorbability leads to the poor productivity of batteries. To improve the electrolytic solution absorbability, it is effective to provide a separator with a large pore size on the surface. Also, to prevent the clogging of a separator with by-products formed by the repetition of charge/discharge cycles, the separator is required to have large pore size on the surface. To ensure enough mechanical strength, however, a layer having a dense structure is needed. Thus, the separator is desired to comprise a coarse-structure layer having a relatively large average pore diameter on at least one surface, and a layer having a dense structure.

OBJECT OF THE INVENTION

Accordingly, an object of this invention is to provide a microporous polyethylene membrane comprising a dense-structure layer, and a coarse-structure layer having a large pore size on at least one surface, thereby having excellent electrolytic solution absorbability, and small air permeability change by compression and large compression deformability, its production method, and a battery separator.

DISCLOSURE OF THE INVENTION

As a result of intense research in view of the above object, the inventors have found that (1) a microporous membrane made of a polyethylene resin comprising ultra-high-molecular-weight polyethylene, and comprising a dense-structure layer and a coarse-structure layer having an increased pore size, the ratio of the dense-structure layer to the coarse-structure layer being controlled within a predetermined range, has excellent electrolytic solution absorbability, small air permeability change by compression, and excellent deformability, and that (2) a microporous polyethylene membrane having excellent electrolytic solution absorbability, small air permeability change by compression and excellent deformability can be produced by extruding a melt blend of the above polyethylene resin and a membrane-forming solvent through a die, stretching the cooled gel-like sheet, bringing at least one surface of the stretched gel-like sheet into contact with a heat roll controlled to a temperature in a range of the crystal dispersion temperature of the polyethylene resin +10° C. or higher and lower than the melting point of the polyethylene resin, and removing the membrane-forming solvent. This invention has been completed based on such findings.

Thus, the microporous polyethylene membrane of this invention is made of a polyethylene resin having a ratio (mass-average molecular weight/number-average molecular weight) of 5 to 300, and comprising 1% or more by mass of ultra-high-molecular-weight polyethylene having a mass-average molecular weight of $7 \times 10^5$ or more, the microporous membrane comprising (a) a coarse-structure layer having an average pore diameter of more than 0.04 μm, which is formed on at least one surface, and (b) a dense-structure layer having an average pore diameter of 0.04 μm or less, an area ratio of the coarse-structure layer to the dense-structure layer in a membrane cross section being 0.1 to 0.8.

The method of this invention for producing a microporous polyethylene membrane comprises the steps of melt-blending a polyethylene resin having a ratio (mass-average molecular weight/number-average molecular weight) of 5 to 300 and comprising 1% or more by mass of ultra-high-molecular-weight polyethylene having a mass-average molecular weight of $7 \times 10^5$ or more, with a membrane-forming solvent; extruding the resultant melt blend through a die; cooling the resultant extrudate to provide a gel-like sheet; stretching the gel-like sheet in at least one direction; bringing at least one surface of the stretched gel-like sheet into contact with a heat roll controlled to a temperature in a range of the crystal dispersion temperature of the polyethylene resin +10° C. or higher and lower than the melting point of the polyethylene resin; and then removing the membrane-forming solvent.

The contact time between the stretched gel-like sheet and the heat roll is preferably 0.5 second to 1 minute, such that the area ratio of the coarse-structure layer to the dense-structure layer in a membrane cross section can be 0.1 to 0.8.

The heat roll can have a smooth or rough surface. The heat roll can have a suction function to exhibit high efficiency of heating the stretched gel-like sheet. The suction pressure is preferably 0.5 to 60 kPa. The stretched gel-like sheet preferably comes into contact with the heat roll having a heating oil on the surface to achieve high heating efficiency.

The stretching temperature is preferably in a range from the crystal dispersion temperature of the polyethylene resin to the melting point of the polyethylene resin +10° C. After removing the membrane-forming solvent remove, the membrane is preferably stretched again to 1.05- to 1.45-fold in at least one direction, to improve the compression resistance.

The battery separator of this invention is formed by the above microporous polyethylene membrane.

BRIEF DESCRIPTION OF THE DRAWING

FIG. 1 is a graph showing the relation between contact time with a heat roll and an area ratio of the coarse-structure layer to the dense-structure layer in a membrane cross section in the microporous polyethylene membrane of Example 8.

DESCRIPTION OF THE PREFERRED EMBODIMENTS

[1] Polyethylene Resin

The microporous polyethylene membrane of this invention, which can be called simply "microporous membrane" below, is made of a polyethylene resin comprising ultra-high-molecular-weight polyethylene having a mass-average molecular weight (Mw) of $7 \times 10^5$ or more in an amount of 1% or more by mass based on 100% by mass of the entire polyethylene resin. The polyethylene resin is preferably (1) a polyethylene composition comprising ultra-high-molecular-weight polyethylene having a Mw of $7 \times 10^5$ or more and polyethylene other than the ultra-high-molecular-weight polyethylene, (2) ultra-high-molecular-weight polyethylene, or (3) a mixture of the polyethylene composition or the ultra-high-molecular-weight polyethylene with a polyolefin other than polyethylene (polyolefin composition). In any case of the polyethylene composition, the ultra-high-molecular-weight polyethylene and the polyolefin composition, the Mw of the polyethylene resin is preferably $1 \times 10^4$ to $1 \times 10^7$, more preferably $5 \times 10^4$ to $15 \times 10^6$, particularly $1 \times 10^5$ to $5 \times 10^6$, through not particularly critical. When the polyethylene resin has Mw of $15 \times 10^6$ or less, melt extrusion can be conducted easily.

(1) Polyethylene Compositions

The ultra-high-molecular-weight polyethylene can be not only an ethylene homopolymer, but also an ethylene-α-olefin copolymer containing a small amount of another α-olefin. The other α-olefins than ethylene are preferably propylene, butene-1, pentene-1, hexene-1,4-methylpentene-1, octene-1, vinyl acetate, methyl methacrylate, and styrene. The Mw of the ultra-high-molecular-weight polyethylene is preferably $1 \times 10^6$ to $15 \times 10^6$, more preferably $1 \times 10^6$ to $5 \times 10^6$. Two or more types of the ultra-high-molecular-weight polyethylene, for instance, a mixture of two or more ultra-high-molecular-weight polyethylenes having different Mws, can be combined.

The polyethylene other than the ultra-high-molecular-weight polyethylene has Mw of less than $7 \times 10^5$, being preferably high-density polyethylene, intermediate-density polyethylene, branched low-density polyethylene and linear low-density polyethylene, more preferably high-density polyethylene. The polyethylene having Mw of less than $7 \times 10^5$ can be not only an ethylene homopolymer, but also a copolymer containing a small amount of another α-olefin such as propylene, butene-1, hexene-1, etc. Such copolymers are preferably produced using single-site catalysts. The polyethylene other than the ultra-high-molecular-weight polyethylene preferably has Mw of $1 \times 10^4$ or more and less than $5 \times 10^5$. Among them, the Mw of high-density polyethylene is more preferably $7 \times 10^4$ or more and less than $5 \times 10^5$, particularly $1 \times 10^5$ or more and less than $5 \times 10^5$. The polyethylene other than the ultra-high-molecular-weight polyethylene can be not only a single substance, but also a mixture of two or more polyethylenes other than the ultra-high-molecular-weight polyethylene. The mixture can be, for instance, a mixture of two or more high-density polyethylenes having different Mws, a mixture of similar intermediate-density polyethylenes, a mixture of similar low-density polyethylenes, etc.

The ultra-high-molecular-weight polyethylene content in the polyethylene composition is 1% or more by mass based on 100% by mass of the total of the ultra-high-molecular-weight polyethylene and the other polyethylene. When this percentage is less than 1% by mass, the microporous membrane has low mechanical strength. This percentage is preferably 3 to 30% by mass.

(2) Ultra-High-Molecular-Weight Polyethylene

The polyethylene resin can be composed only of ultra-high-molecular-weight polyethylene, which can be the same as described above.

(3) Polyolefin Composition

The polyolefin composition is a mixture of the polyethylene composition or the ultra-high-molecular-weight polyethylene with the polyolefin other than polyethylene. The polyethylene composition and the ultra-high-molecular-weight polyethylene can be the same as described above.

The polyolefin other than polyethylene can be at least one selected from the group consisting of polypropylene, polybutene-1, polypentene-1, polyhexene-1, polyoctene-1 and an ethylene-α-olefin copolymer each having Mw of $1 \times 10^4$ to $4 \times 10^6$, and polyethylene wax having Mw of $1 \times 10^3$ to $1 \times 10^4$. Polybutene-1, polypentene-1, polyhexene-1 and polyoctene-1 can be not only homopolymers, but also copolymers containing other α-olefins. The content of the polyolefin other than polyethylene is preferably 20% or less by mass, more preferably 10% or less by mass, based on 100% by mass of the entire polyethylene resin.

(4) Molecular Weight Distribution Mw/Mn

When the polyethylene resin is the above polyethylene composition or the ultra-high-molecular-weight polyethylene, the Mw/Mn of the polyethylene resin is 5 to 300. When the Mw/Mn is less than 5, there are excessive high-molecular weight components, resulting in difficulty in melt extrusion. When the Mw/Mn is more than 300, there are excessive low-molecular weight components, resulting in a microporous membrane with decreased strength. The Mw/Mn is preferably 5 to 100, more preferably 5 to 30. The Mw/Mn is a measure of a molecular weight distribution, the larger this value, the wider the molecular weight distribution. The Mw/Mn of polyethylene (homopolymer or ethylene-α-olefin copolymer) can properly be controlled by multi-stage polymerization. The multi-stage polymerization method is preferably a two-stage polymerization method comprising forming a high-molecular-weight polymer component in the first stage and forming a low-molecular-weight polymer component in the second stage. In the case of the polyethylene composition, the larger the Mw/Mn, the larger difference in Mw between the ultra-high-molecular-weight polyethylene and the other polyethylene, and vice versa. The Mw/Mn of the polyethylene composition can be properly controlled by the molecular weight and percentage of each component.

[2] Production Method of Microporous Polyethylene Membrane

The method of this invention for producing a microporous polyethylene membrane comprises the steps of (1) melt-blending the above polyethylene resin with a membrane-forming solvent to prepare a polyethylene solution, (2) extruding the polyethylene solution through a die, (3) cooling the resultant extrudate to provide a gel-like sheet, (4) first stretching the gel-like sheet, (5) bringing at least one surface of the stretched gel-like sheet into contact with a heat roll, (6) removing the membrane-forming solvent, (7) drying the resultant membrane, and (8) second stretching the membrane. After the step (8), if necessary, a heat treatment (9), a cross-linking step (10) with ionizing radiations, a hydrophilizing step (11), a surface-coating step (12), etc. can be conducted.

(1) Preparation of Polyethylene Solution

The polyethylene resin and a membrane-forming solvent are melt-blended to prepare a polyethylene solution. The polyethylene solution can contain various additives such as antioxidants, ultraviolet absorbents, antiblocking agents, pigments, dyes, inorganic fillers, etc., if necessary, in ranges not deteriorating the effects of this invention. Fine silicate powder, for instance, can be added as a pore-forming agent.

The membrane-forming solvent can be liquid or solid. The liquid solvents can be aliphatic or cyclic hydrocarbons such as nonane, decane, decalin, p-xylene, undecane, dodecane, liquid paraffin, etc.; and mineral oil distillates having boiling points corresponding to those of the above hydrocarbons. To obtain a gel-like sheet having a stable liquid solvent content, non-volatile liquid solvents such as liquid paraffin are preferable. The solid solvent preferably has melting point of 80° C. or lower. Such solid solvents are paraffin wax, ceryl alcohol, stearyl alcohol, dicyclohexyl phthalate, etc. The liquid solvent and the solid solvent can be used in combination.

The viscosity of the liquid solvent is preferably 30 to 500 cSt, more preferably 50 to 200 cSt, at a temperature of 25° C. When this viscosity is less than 30 cSt, the polyethylene solution is unevenly extruded through a die lip, resulting in difficulty in blending. The viscosity of more than 500 cSt makes the removal of the liquid solvent difficult.

Though not particularly critical, the uniform melt blending of the polyethylene solution is preferably conducted in a double-screw extruder. Melt-blending in a double-screw extruder is suitable for preparing a high-concentration polyethylene solution. When the polyethylene resin is the polyethylene composition or the ultra-high-molecular-weight polyethylene, the melt-blending temperature is preferably the melting point of the polyethylene resin +10° C. to the melting point +100° C. When the polyethylene resin is the polyolefin composition, the melt-blending temperature is preferably the melting point of the polyethylene composition or the ultra-high-molecular-weight polyethylene contained in the polyolefin composition +10° C. to the melting point +100° C. Specifically, the melt-blending temperature is preferably in a range of 140° C. to 250° C., more preferably in a range of 170° C. to 240° C. The melting point is measured by differential scanning calorimetry (USC) according to JIS K7121.

The membrane-forming solvent can be added before blending, or charged into the extruder at an intermediate position during blending, though the latter is preferable. In the melt blending, an antioxidant is preferably added to prevent the oxidization of the polyethylene resin.

In the polyethylene solution, the polyethylene resin is preferably 10 to 50% by mass, more preferably 15 to 40% by mass, based on 100% by mass of the total of the polyethylene resin and the membrane-forming solvent. Less than 10% by mass of the polyethylene resin content undesirably causes decrease in low productivity. In addition, large swelling and neck-in occur at the die exit in the extrusion of the polyethylene solution, resulting in decrease in the formability and self-supportability of the gel-like molding. More than 50% by mass of the polyethylene resin content deteriorates the formability of the gel-like molding.

(2) Extrusion

The melt-blended polyethylene solution is extruded through the die of the extruder directly or through a die of another extruder, or once cooled to pellets and extruded through a die of an extruder again. Although a sheet-forming, rectangular die lip is usually used, a double-cylindrical die lip, an inflation die lip, etc. can also be used. The sheet-forming die lip usually has a die lip gap of 0.1 to 5 mm, and heated at 140 to 250° C. during extrusion. The extrusion speed of the heated solution is preferably in a range of 0.2 to 15 m/minute.

(3) Formation of Gel-Like Sheet

A gel-like extrudate of the polyethylene solution extruded from the die is cooled to obtain a gel-like sheet. The cooling is preferably conducted to at least a gelation temperature at a speed of 50° C./minute or more, to accelerate the crystallization of polypropylene. The cooling is preferably conducted to 25° C. or lower. The micro-phase separation of a resin phase (a polyethylene resin phase in the gel-like sheet) is thus fixed by the membrane-forming solvent. In general, a low cooling speed provides the gel-like sheet with a coarse high-order structure, and large pseudo-cell units constituting the high-order structure, while a high cooling speed provides dense cell units. The cooling speed of less than 50° C./minute increases the crystallization of polyethylene, making it difficult to form a stretchable gel-like sheet. The cooling method can be a method of direct contacting with cooling air, cooling water or other cooling media, a method of contacting with roll cooled by a cooling medium, etc.

(4) First Stretching

The resultant gel-like sheet is stretched in at least one direction. The stretching causes cleavage between polyethylene crystal lamellas, resulting in fine polyethylene phase with large numbers of fibrils. The fibrils form a three-dimensional network structure (three-dimensionally and irregularly connected network structure). Because the gel-like sheet contains a membrane-forming solvent, it can be uniformly stretched. After heating, the gel-like sheet is stretched to a predetermined magnification by a tenter method, a roll method, an inflation method, a rolling method, or their combination. Although the first stretching can be monoaxial or biaxial, biaxial stretching is preferable. The biaxial stretching can be simultaneous biaxial stretching, sequential stretching, or multi-stage stretching (for instance, a combination of simultaneous biaxial stretching and sequential stretching), though the simultaneous biaxial stretching is particularly preferable.

The stretching magnification is preferably 2-fold or more, more preferably 3- to 30-fold in the case of monoaxial stretching. In the case of biaxial stretching, it is at least 3-fold in both directions, with an area magnification of preferably 9-fold or more, more preferably 25-fold or more. The area magnification of less than 9-fold results in insufficient stretching, failing to providing a high-modulus, high-strength microporous membrane. When the area magnification is more than 400-fold, restrictions occur on stretching apparatuses, stretching operations, etc.

When the polyethylene resin is the polyethylene composition or the ultra-high-molecular-weight polyethylene, the first stretching temperature is in a range from the crystal dispersion temperature of the polyethylene resin to its melting point +10° C. When the polyethylene resin is the polyolefin composition, the first stretching temperature is in a range from the crystal dispersion temperature of the polyethylene composition or the ultra-high-molecular-weight polyethylene contained in the polyolefin composition to its melting point +10° C. When this stretching temperature is higher than the crystal dispersion temperature +10° C., the stretched molecular chains have poor orientation. When the stretching temperature is lower than the crystal dispersion temperature, the resin is so insufficiently softened that rupture is likely to occur in stretching, thus failing to achieve high-magnification stretching. The stretching temperature is preferably in a range of the crystal dispersion temperature +10° C. or higher and lower than the melting point. The crystal dispersion temperature is determined by measuring the temperature properties of dynamic viscoelasticity according to ASTM D 4065. The crystal dispersion temperature of the polyethylene composition and the ultra-high-molecular-weight polyethylene are in a range of 90 to 100° C. Accordingly, the stretching temperature is preferably in a range of 90 to 145° C., more preferably in a range of 100 to 135° C.

Depending on the desired properties, stretching can be conducted with a temperature distribution in a thickness direction in a range not deteriorating the effects of this invention, to provide a microporous membrane with higher mechanical strength. This method is described specifically in Japanese Patent 3347854.

(5) Hot Roll Treatment

At least one surface of the stretched gel-like sheet is brought into contact with a heat roll to form a coarse-structure layer.

(a) Roll

The roll can have a smooth or rough surface. The roll can have a function to suck the stretched gel-like sheet.

(i) Smooth Roll

The smooth roll can be a rubber or metal roll. The rubber roll has a large effect of preventing the slipping of the membrane.

(ii) Rough-Surface Roll

The surface pattern of the rough-surface roll is not particularly critical. The rough-surface roll can be of any known type, for instance, a punched roll having large numbers of penetrating punched holes each having geometrical, shape, a slit roll having large numbers of penetrating slit holes, a cup roll having a mesh-type roughness, a wire roll having a wire circumferentially wound around its surface at a constant pitch to have large numbers of grooves, a grooved roll having large numbers of grooves extending axially and/or circumferentially at a constant pitch, or irregular grooves, a engraved roll having a rough pattern having a geometrical shape (for instance, conical, pyramidal or semi-spherical shape), etc.

The punched roll can be engraved with large numbers of grooves at a constant pitch. The wire roll can be obtained by circumferentially winding a wire at a constant pitch around a roll having punch-type or slit-type penetrating holes. The wire roll can have a round wire or a ribbon wire. The round wire can have a polished surface. The ribbon wire can be embossed.

The above rough-surface roll can have a porous sintered metal layer or a metal sleeve on a circumferential surface. The recesses of the rough-surface roll are as deep as preferably 0.01 to 0.5 mm, more preferably 0.02 to 0.3 mm. The mesh volume (recess volume) per 1 cm² of a roll surface is preferably 5 to 50 mm³. The rough-surface roll is commercially available, for instance, as "Yuri Cup Roll" available from Yuri Roll Co., Ltd.

(iii) Suction Roll

Using a roll having a sucking function (referred to as "suction roll" unless otherwise mentioned), the stretched gel-like sheet can be heat-treated under tension, resulting in high efficiency of heating the stretched gel-like sheet. The structure of the suction roll is not particularly critical, but the suction roll can comprise a cylinder body having an evacuatable hollow inner space, and large numbers of penetrating holes communicating with the hollow inner space; a pair of side plates attached to both ends of the cylinder body, at least one of the side plates having a hole communicating with the hollow inner space; and a pair of bearings having a penetrating hole communicating with the hole of the side plate. The hollow inner space is evacuated by suction by a vacuum pump connected to the penetrating hole of the bearing via the piping, so that the suction roll rotated by a motor can suck the stretched gel-like sheet on the surface.

The surface shape of the suction roll is not particularly critical. The suction roll can be of a known type, such as a punching suction roll having large numbers of penetrating punched holes each having a geometrical shape, a slit suction roll having large numbers of penetrating slits, etc. The punching suction roll and the slit suction roll can have a porous sintered metal layer or a metal sleeve on a circumferential surface. The punching suction roll can be engraved with large numbers of grooves at a constant pitch. Also usable is a wire suction roll obtained by circumferentially winding a wire at a constant pitch around a roll having punched holes or slits to have large numbers of grooves. The wire can be a round wire or a ribbon wire. The surface of the round wire can be polished. The ribbon wire can be embossed.

The suction roll is described in, for instance, Japanese Patent 2630870, Japanese Patent 2899226, JP 63-247251 A, JP 63-267648 A, JP 4-260561 A, JP 8-133536 A, JP 8-208100 A, JP 9-67053 A, JP 2002-160857 A, JP 2002-255423 A, etc. Such suction roll is commercially available as a wire suction roll of Bellmatic Ltd.

The penetrating holes of the suction roll are preferably as large as 10 to 5,000 μm in diameter. When the penetrating holes are smaller than 10 μm, the suction roll has low suction power. When the penetrating holes are larger than 5,000 μm, the microporous membrane is likely to have suction marks. The penetrating hole diameter is more preferably 20 to 2,000 μm, particularly 30 to 500 μm. The penetrating hole diameter used herein is a diameter of the maximum circle inscribed in the penetrating hole of the suction roll. For instance, when the suction roll is a wire suction roll, a punching suction roll or a slit suction roll, the penetrating hole diameter is a gap between wires, a transverse length of the slit, and a diameter of the maximum circle inscribed in the punched hole, respectively.

Though not critical, the rate of an opening area in the suction roll surface is preferably 1 to 50%. When this rate of an opening area is less than 1%, the suction roll has low suction power. When this rate exceeds 50%, the roll is undesirably weakened. Though not critical, the axial gap between the penetrating holes is preferably 0.5 to 10 mm.

(iv) Roll Diameter

The roll diameter is preferably 5 to 500 cm, more preferably 10 to 200 cm. When this diameter is less than 5 cm, there is a small contact area between the stretched gel-like sheet and the roll, resulting in an insufficient heat treatment. When this diameter is more than 500 cm, too large a facility is needed.

(v) Heating Method of Roll

The heating method of the roll is not particularly critical. For instance, a method of heating the roll by a heating medium such as a heating oil inside or outside the roll, a method of heating the roll by a heating means such as an electric heater inside or outside the roll, a method of heating the roll by hot air from a means such as an air blower or nozzle outside the roll, a method of generating heat from the roll by electromagnetic induction, etc. can be properly selected depending on the structure, material, etc. of the roll.

(b) Heating Method of Stretched Gel-Like Sheet

By adjusting the roll temperature, the contact time between the roll and the stretched gel-like sheet, etc., the average pore diameter and ratio of the coarse-structure layer can be controlled. Before contact with a heat roll, the heat-stretched gel-like sheet is preferably cooled to a temperature lower than the crystal dispersion temperature of the polyethylene resin.

When the polyethylene resin is the polyethylene composition or the ultra-high-molecular-weight polyethylene, the temperature of the heat roll is in a range of the crystal dispersion temperature of the polyethylene resin +10° C. or higher and lower than the melting point of the polyethylene resin. When the polyethylene resin is the polyolefin composition, the temperature of the heat roll is in a range of the crystal dispersion temperature of the polyethylene composition or the ultra-high-molecular-weight polyethylene contained in the polyolefin composition +10° C. or higher and lower than the melting point. When this temperature is lower than the crystal dispersion temperature +10° C., a coarse-structure layer is not sufficiently formed. When the temperature of the heat roll is equal to or higher than the melting point, too much a coarse-structure layer is formed. The temperature of the heat roll is preferably in a range of the crystal dispersion temperature +20° C. or higher and lower than the melting point. Because the crystal dispersion temperature of polyethylene is generally 90 to 100° C. as described above, the temperature of the heat roll is usually in a range of 110° C. or higher and lower than 135° C., preferably in a range of 120° C. or higher and lower than 135° C. In general, the ratio of the coarse-structure layer increases in proportion with the temperature of the heat roll.

The contact time between the heat roll and the stretched gel-like sheet is preferably 0.5 second to 1 minute, more preferably 1 to 30 seconds, particularly 1 to 10 seconds. When the contact time is less than 0.5 second, a coarse-structure layer is not sufficiently formed. When the contact time is more than 1 minute, too much a coarse-structure layer is formed. In general, the ratio of the coarse-structure layer increases in proportion with the contact time.

When a smooth or rough-surface roll is used, the stretched gel-like sheet comes into contact with the roll having a heating oil on the surface to achieve high heating efficiency, thereby providing the coarse-structure layer with a larger average pore diameter. Particularly when the rough-surface roll is used, the heating oil is held in recesses, resulting in improved efficiency of heating the stretched gel-like sheet. The oil is preferably the above liquid membrane-forming solvent, more preferably liquid paraffin, though it can be the same as or different from, the oil used in the production of the polyethylene solution.

To keep the heating oil on the roll surface, a method of bringing the stretched gel-like sheet into contact with a roll immersed in a heating oil, and a method of immersing a roll heated by a heating means such as a hot air blower, etc. in an oil bath at room temperature, thereby coating the roll surface with a heated oil can be used, and the former is preferable.

The temperature of the heating oil can be the same as the above temperature of the heat roll. Because the roll is heated by the oil by immersion in a heated oil bath, the roll need not be heated by other means, though it can be heated by other means, if necessary.

The average pore diameter and ratio of the coarse-structure layer can be controlled by adjusting the amount of the heating oil supplied to the stretched gel-like sheet by the roll. The amount of the heating oil used is preferably 1 to 20 g, more preferably 5 to 15 g, per 1 $m^2$ of the stretched gel-like sheet. The amount of the heating oil supplied by the roll can be controlled by adjusting the recess depth, mesh volume, rotation speed, etc. of the rough-surface roll.

When the suction roll is used, the suction pressure (difference between the atmospheric pressure and pressure in the inner space of the suction roll) is preferably 0.5 to 60 kPa, more preferably 1 to 40 kPa, particularly 3 to 20 kPa. When the suction pressure is lower than 0.5 kPa, it is difficult to apply tension to the stretched gel-like sheet. When the suction pressure is higher than 60 kPa, suction marks are easily added to the gel-like sheet.

When a coarse-structure layer is formed on a surface of the gel-like sheet, the stretched gel-like sheet can be continuously heat-treated while conveying by one heat roll, but pluralities of heat rolls can be used, if necessary. When coarse-structure layers are formed on both surfaces of the stretched gel-like sheet, the stretched gel-like sheet can be continuously conveyed by pluralities of heat rolls, such that each surface of the stretched gel-like sheet comes into contact with the heat roll. In this case, the stretched gel-like sheet can pass between a pair of heat rolls, or two heat rolls can be disposed such that both surfaces of the stretched gel-like sheet come into contact with the heat rolls.

(6) Removal of Membrane-Forming Solvent

The membrane-forming solvent is removed (washed away) using a washing solvent. Because the polyethylene resin phase is separated from the membrane-forming solvent phase, the removal of the membrane-forming solvent provides a microporous membrane composed of fibrils constituting a fine, three-dimensional network structure and having three-dimensionally and irregularly communicating pores (gaps). The washing solvents can be volatile solvents, for instance, saturated hydrocarbons such as pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2F_5$, etc. These washing solvents have a low surface tension, for instance, 24 mN/m or less at 25° C. The use of a washing solvent having a low surface tension suppresses a pore-forming network structure from shrinking due to a surface tension of gas-liquid interfaces during drying after washing, thereby providing a microporous membrane having high porosity and permeability.

The washing of the heat-treated gel-like sheet can be conducted by a washing-solvent-immersing method, a washing-solvent-showering method, or a combination thereof. The amount of the washing solvent used is preferably 300 to 30,000 parts by mass per 100 parts by mass of the stretched membrane. The washing temperature can usually be 15 to 30° C., and heat-washing can be conducted, if necessary. The heat-washing temperature is preferably 80° C. or lower. Washing with the washing solvent is preferably conducted until the amount of the remaining liquid solvent becomes less than 1% by mass of that added.

(7) Drying of Membrane

The microporous polyethylene membrane obtained by stretching, heat-treating with roll and the removal of the membrane-forming solvent is then dried by a heat-drying method, a wind-drying method, etc. When the polyethylene resin is the polyethylene composition or the ultra-high-molecular-weight polyethylene, the drying temperature is preferably equal to or lower than the crystal dispersion temperature of the polyethylene resin. When the polyethylene resin is the polyolefin composition, it is preferably equal to or lower than the crystal dispersion temperature of the polyethylene composition or the ultra-high-molecular-weight polyethylene contained in the contained in the polyolefin composition. The drying temperature is preferably 5° C. or more lower than the crystal dispersion temperature. Drying is conducted until the percentage of the remaining washing solvent becomes preferably 5% or less by mass, more preferably 3% or less by mass, based on 100% by mass of the microporous membrane (dry weight). Insufficient drying undesirably reduces the porosity of the microporous membrane in subsequent second stretching and heat treatment steps, thereby resulting in poor permeability.

(8) Second Stretching

The dried membrane is stretched again in at least one direction. The second stretching can be conducted while heating by a tenter method, etc. like the first stretching. The second stretching can be monoaxial or biaxial.

The second stretching magnification is 1.05- to 1.45-fold. In the case of monoaxial stretching, for instance, the second stretching magnification is 1.05- to 1.45-fold in a longitudinal direction (MD) or in a transverse direction (TD). As long as the stretching magnification is 1.05- to 1.45-fold in each of MD and TD in biaxial stretching, the second stretching magnifications in MD and TD can be different, but are preferably the same. When this magnification is less than 1.05-fold, the membrane has insufficient compression resistance. When this magnification is more than 1.45-fold, the membrane is highly likely broken, and undesirably suffers decreased heat shrinkage resistance.

When the polyethylene resin is the polyethylene composition or the ultra-high-molecular-weight polyethylene, the second stretching temperature is preferably in a range from the crystal dispersion temperature of the polyethylene resin to the crystal dispersion temperature +40° C. When the polyethylene resin is the polyolefin composition, it is preferably in a range from the crystal dispersion temperature of the polyethylene composition or the ultra-high-molecular-weight polyethylene contained in the polyolefin composition to the crystal dispersion temperature +40° C. When the second stretching temperature exceeds the crystal dispersion temperature +40° C., the permeability and the compression resistance are lowered, the compression resistance is lowered, and there is large unevenness in properties (particularly air permeability) in a width direction when stretched in TD. When the second stretching temperature is lower than the crystal dispersion temperature, the polyethylene resin is insufficiently softened, making it likely that the membrane is broken by stretching, thus failing to achieve uniform stretching. The second stretching temperature is more preferably in a range from the crystal dispersion temperature +10° C. to the crystal dispersion temperature +40° C. Specifically, the second stretching temperature is preferably in a range of 90 to 140° C., more preferably 100 to 130° C.

The above second stretching after the solvent-removing step improves the permeability and compression resistance of the microporous membrane. Because the pore diameter can be easily controlled by adjusting the second stretching magnification, the pore diameter can be adjusted depending on the application of the microporous membrane.

(9) Heat Treatment

The second stretched membrane is preferably heat-treated. The heat treatment stabilizes crystals and makes lamellas uniform. The heat treatment can be heat setting and/or annealing. Particularly heat-setting stabilizes crystals in the membrane, keeping a network structure constituted by fibrils made finer by the second stretching, thereby providing a microporous membrane with excellent electrolytic solution absorbability and strength. When the polyethylene resin is the polyethylene composition or the ultra-high-molecular-weight polyethylene, the heat-setting temperature is preferably equal to or lower than the melting point of the polyethylene resin. When the polyethylene resin is the polyolefin composition, the heat-setting temperature is preferably equal to or lower than the melting point of the polyethylene composition or the ultra-high-molecular-weight polyethylene contained in the polyolefin composition. The heat-setting temperature is more preferably in a range from the crystal dispersion temperature to the melting point. The heat-setting treatment can be conducted by a tenter method, a roll method or a rolling method.

The annealing can be conducted using a belt conveyer or an air-floating furnace in addition to the above method. When the polyethylene resin is the polyethylene composition or the ultra-high-molecular-weight polyethylene, the annealing temperature is preferably equal to or lower than the melting point of the polyethylene resin. When the polyethylene resin is the polyolefin composition, it is preferably equal to or lower than the melting point of the polyethylene composition or the ultra-high-molecular-weight polyethylene contained in the polyolefin composition. The annealing temperature is more preferably in a range from 60° C. to the melting point −10° C. Shrinkage by the annealing is controlled such that the length of the second-stretched membrane in a second stretching direction remains preferably 91% or more, more preferably 95% or more, of that before the second stretching. When this shrinkage is less than 91% in a length retention ratio, the membrane after the second stretching has a poor balance of properties, particularly permeability, in a width direction. Such annealing provides a high-strength microporous membrane with good permeability. The heat-setting and the annealing can be combined.

(10) Cross-Linking of Membrane the second-stretched microporous membrane can be cross-linked by ionizing radiation of α-rays, β-rays, γ-rays, electron beams, etc. The electron beam irradiation is preferably conducted at 0.1 to 100 Mrad and accelerating voltage of 100 to 300 kV. The cross-linking treatment elevates the meltdown temperature of the multi-layer, microporous polyethylene membrane.

(11) Hydrophilizing

The second-stretched microporous membrane can be hydrophilized. The hydrophilizing treatment can be a monomer-grafting treatment, a surfactant treatment, a corona-discharging treatment, etc. The monomer-grafting treatment is preferably conducted after cross-linking.

In case of the surfactant treatment, any of nonionic surfactants, cationic surfactants, anionic surfactants and amphoteric surfactants can be used, but the nonionic surfactants are preferable. The microporous membrane is dipped in a solution of the surfactant in water or a lower alcohol such as methanol, ethanol, isopropyl alcohol, etc., or coated with the solution by a doctor blade method.

(12) Surface-Coating

The second-stretched microporous membrane can be coated with porous polypropylene, a porous fluororesin such as polyvinylidene fluoride and polytetrafluoroethylene, porous polyimide, porous polyphenylene sulfide, etc., to improve meltdown properties when used as a battery separator. Polypropylene for a coating layer preferably has Mw of 5,000 to 500,000, and solubility of 0.5 g or more in 100 g of toluene at a temperature of 25° C. This polypropylene more preferably has a racemic diad fraction of 0.12 to 0.88. In the racemic diad, two connected monomer units are in an enantiomer relation. The coating layer can be formed, for instance, by coating the microporous membrane with a mixed solution containing the above coating resin and its good solvent, removing the good solvent to increase the concentration of the resin, thereby forming a structure in which a resin phase is separated from a good solvent phase, and removing the remaining good solvent.

(13) Other Embodiments

The method of this invention for producing a microporous polyethylene membrane can comprise, in addition to the above steps (1)-(12), a step (a) of heat-setting the stretched gel-like sheet in contact with the heat roll before washing, a step (b) of bringing the unwashed, stretched gel-like sheet in contact with the heat roll into contact with a hot, solvent, and a step (c) of bringing the washed microporous membrane into contact with a hot solvent, if necessary. Any one of these steps (a) to (c) increases the average pore diameter of the coarse-structure layer. The above heat-setting step (a) can be the same as described above. The above hot solvent treatment (b) and (c) will be described below.

The hot solvent treatment is preferably conducted on the stretched gel-like sheet in contact with the heat roll before washing. Solvents usable for the heat treatment are preferably the above liquid membrane-forming solvents, more preferably liquid paraffin. The heat treatment solvents can be the same as or different from those used for preparing the polyethylene solution.

The hot solvent treatment method is not particularly critical as long as the unwashed, stretched gel-like sheet or microporous membrane comes into contact with a hot solvent. It includes, for instance, a method of directly contacting the unwashed, stretched gel-like sheet or microporous membrane with a hot solvent (simply called "direct method" unless otherwise mentioned), a method of contacting the unwashed, stretched gel-like sheet or microporous membrane with a cold solvent and then heating it (simply called, "indirect method" unless otherwise mentioned), etc. The direct method includes a method of immersing the unwashed, stretched gel-like sheet or microporous membrane in a hot solvent, a method of spraying a hot solvent to the unwashed, stretched gel-like sheet or microporous membrane, a method of coating the unwashed, stretched gel-like sheet or microporous membrane with a hot solvent, etc., and the immersing method is preferable for uniform treatment. In the indirect method, the unwashed, stretched gel-like sheet or microporous membrane is immersed in a cold solvent, sprayed with a cold solvent, or coated with a cold solvent, and then brought into contact with a heat roll, heated in an oven, or immersed in a hot solvent.

When the polyethylene resin is the polyethylene composition or the ultra-high-molecular-weight polyethylene, the hot solvent temperature is preferably in a range from the crystal dispersion temperature of the polyethylene resin to its melting point +10° C. When the polyethylene resin is the polyolefin composition, it is the polyethylene composition or the ultra-high-molecular-weight polyethylene contained in the polyolefin composition preferably in a range from the crystal dispersion temperature to its melting point +10° C. Specifically, the hot solvent temperature is 110 to 140° C. preferably, 115 to 135° C. more preferably. The contact time is preferably 0.1 seconds to 10 minutes, more preferably 1 second to 1 minute. When the hot solvent temperature is lower than the crystal dispersion temperature, or when the contact time is less than 0.1 seconds, sufficient hot solvent treatment effect cannot be obtained. When the hot solvent temperature is higher than the melting point +10° C., or when the contact time is more than 10 minutes, the microporous membrane undesirably has low strength and is prone to be broken.

The above hot solvent treatment increases the pore diameters on both surfaces of the microporous membrane. As long as the temperature and time of the hot solvent treatment are within the above ranges, the dense-structure layer does not disappear in the membrane.

After the hot solvent treatment, the unwashed, stretched gel-like sheet or microporous membrane is washed to remove the remaining heat treatment solvent. Because the washing method per se can be the same as the above method of removing a membrane-forming solvent, description will be omitted. Needles to say, when the hot solvent treatment is conducted on the unwashed, stretched gel-like sheet, the heat treatment solvent can be removed by the above method of removing a membrane-forming solvent.

[3] Structure and Properties of Microporous Polyethylene Membrane

The microporous polyethylene membrane of this invention has a gradient structure comprising (a) a coarse-structure layer having an average pore diameter of more than 0.04 µm, which is formed on at least one surface, and (b) a dense-structure layer having an average pore diameter of 0.04 µm or less, an area ratio of the coarse-structure layer to the dense-structure layer in the membrane cross section being 0.1 to 0.8. The average pore diameter of the coarse-structure layer is preferably 0.05 µm or more. The average pore diameter of the coarse-structure layer is preferably 1.5-fold or more that of the dense-structure layer. When the above area ratio is less than 0.1, the microporous membrane undergoes large air permeability change when compressed, while having low electrolytic solution absorbability. When it is more than 0.8, the microporous membrane has low mechanical strength. The coarse-structure layer can be formed on one or both surfaces. The average pore diameters of the dense-structure layer and the coarse-structure layer, and the area ratio of the coarse-structure layer to the dense-structure layer in the membrane cross section can be determined from a transmission electron photomicrograph (TEM photograph) of a cross section of the microporous membrane.

The microporous polyethylene membrane according to a preferred embodiment of this invention has the following properties.

(1) Porosity of 25 to 80%

With the porosity of less than 25%, the microporous polyethylene membrane does not have good air permeability. When the porosity exceeds 80%, the microporous membrane used as a battery separator does not have enough strength, resulting in a high likelihood of short-circuiting between electrodes.

(2) Air Permeability of 20 to 400 Seconds/100 cm$^3$ (Converted to Value at 20-µm Thickness)

When the air permeability is in a range from 20 seconds/100 cm$^3$ to 400 seconds/100 cm$^3$, batteries having separators formed by the microporous polyethylene membrane have large capacity and good cycle properties. When the air permeability is less than 20 seconds/100 cm$^3$, shutdown does not fully occur when the temperature is elevated in the batteries.

(3) Pin Puncture Strength of 3,000 mN/20 µm or More

With the pin puncture strength of less than 3,000 mN/20 µm, a battery comprising the microporous polyethylene membrane as a separator likely suffers short-circuiting between electrodes. The pin puncture strength is preferably 3,500 mN/20 µm or more.

(4) Tensile Rupture Strength of 80,000 kPa or More

With the tensile rupture strength of 80,000 kPa or more in both longitudinal direction (MD) and transverse direction (TD), the battery separator formed by the membrane is unlikely ruptured. The tensile rupture strength is preferably 100,000 kPa or more in both MD and TD.

(5) Tensile Rupture Elongation of 100% or More

With the tensile rupture elongation of 100% or more in both longitudinal direction (MD) and transverse direction (TD), the battery separator formed by the membrane is unlikely ruptured.

(6) Heat Shrinkage Ratio of 10% or Less

When the heat shrinkage ratio exceeds 10% in both longitudinal direction (MD) and transverse direction (TD) after exposed to 105° C. for 8 hours, a battery separator formed by the microporous polyethylene membrane shrinks by heat generated by a battery, resulting in high likelihood of short-circuiting in its ends. The heat shrinkage ratio is preferably 8% or less in both MD and TD.

(7) Thickness Change Ratio of 10% or More by Heat Compression

The thickness change ratio by heat compression at a temperature of 90° C. and a pressure of 2.2 MPa (22 kgf/cm$^2$) for 5 minutes is 10% or more, based on 100% of the thickness before compression. With the thickness change ratio of 10% or more, a separator formed by the microporous membrane provides a battery with large capacity and good cycle properties. This thickness change ratio is preferably 12% or more.

(8) Post-Compression Air Permeability of 700 sec/100 cm$^3$ or Less

The post-compression air permeability (Gurley value) measured after heat compression under the above conditions is 700 sec/100 cm$^3$ or less. With the post-compression air permeability of 700 sec/100 cm$^3$ or less, a separator formed by the microporous membrane provides a battery with large capacity and good cycle properties. The post-compression air permeability is preferably 600 sec/100 cm$^3$ or less.

[4] Battery Separator

The thickness of the battery separator formed by the above microporous polyethylene membrane is preferably 5 to 50 µm, more preferably 10 to 35 µm, though properly selected depending on the types of batteries.

[5] Battery

The microporous polyethylene membrane of this invention can be used preferably as a separator for secondary batteries such as nickel-hydrogen batteries, nickel-cadmium batteries, nickel-zinc batteries, silver-zinc batteries, lithium secondary batteries, lithium polymer secondary batteries, etc., particularly as a separator for lithium secondary batteries, Taking the lithium secondary battery for example, description will be made below.

The lithium secondary battery comprises a cathode and an anode laminated via a separator, the separator containing an electrolytic solution (electrolyte). The electrode can be of any known structure, not particularly critical. The electrode structure can be, for instance, a coin type in which disc-shaped cathode and anode are opposing, a laminate type in which planar cathode and anode are alternately laminated, a toroidal type in which ribbon-shaped cathode and anode are wound, etc.

The cathode usually comprises (a) a current collector, and (b) a cathodic active material layer capable of absorbing and discharging lithium ions, which is formed on the current collector. The cathodic active materials can be inorganic compounds such as transition metal oxides, composite oxides of lithium and transition metals (lithium composite oxides), transition metal sulfides, etc. The transition metals can be V, Mn, Fe, Co, Ni, etc. Preferred examples of the lithium composite oxides are lithium nickelate, lithium cobaltate, lithium manganate, laminar lithium composite oxides having an $\alpha$-NaFeO$_2$ structure, etc. The anode comprises (a) a current collector, and (b) an anodic active material layer formed on the current collector. The anodic active materials can be carbonaceous materials such as natural graphite, artificial graphite, cokes, carbon black, etc.

The electrolytic solutions can be obtained by dissolving lithium salts in organic solvents. The lithium salts can be LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$C$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. The lithium salts can be used alone or in combination. The organic solvents can be organic solvents having high boiling points and high dielectric constants such as ethylene carbonate, propylene carbonate, ethylmethyl carbonate, $\gamma$-butyrolactone, etc.; organic solvents having low boiling points and low viscosity such as tetrahydrofuran, 2-methyltetrahydrofuran, dimethoxyethane, dioxolane, dimethyl carbonate, diethyl carbonate, etc. These organic solvents can be used alone or in combination. Because organic solvents having high dielectric constants have high viscosity, while those having low viscosity have low dielectric constants, their mixtures are preferably used.

When the battery is assembled, the separator can be impregnated with the electrolytic solution, so that the separator (microporous membrane) is provided with ion permeability. The impregnation treatment can be (and usually is) conducted by immersing the microporous membrane in the electrolytic solution at room temperature. When a cylindrical battery is assembled, for instance, a cathode sheet, a separator formed by the microporous membrane, and an anode sheet are laminated in this order, and the resultant laminate is wound to a toroidal-type electrode assembly. The resulting electrode assembly can be charged into a battery can and impregnated with the above electrolytic solution. The resulting electrode assembly can be charged into a battery can and impregnated with the above electrolytic solution. A battery lid acting as a cathode terminal equipped with a safety valve can be caulked to the battery can via a gasket to produce a battery.

This invention will be described in more detail with reference to Examples below without intention of restricting the scope of this invention.

Example 1

Dry-blended were 100 parts by mass of a polyethylene composition comprising 18% by mass of ultra-high-molecular-weight polyethylene (UHMWPE) having a mass-average molecular weight (Mw) of $2.0 \times 10^6$ and Mw/Mn of 8, and 82% by mass of high-density polyethylene (HDPE) having Mw of $3.0 \times 10^5$ and Mw/Mn of 8.6, with 0.375 parts by mass of tetrakis[methylene-3-(3,5-ditertiary-butyl-4-hydroxyphenyl)-propionate]methane as an antioxidant. Measurement revealed that the polyethylene composition comprising UHMWPE and HDPE had Mw of $6.0 \times 10^5$, Mw/Mn of 13.5, a melting point of 135° C., and a crystal dispersion temperature of 100° C.

The Mws and Mw/Mn ratios of the UHMWPE, the HDPE and the polyethylene composition were measured by gel permeation chromatography (GPC) under the following conditions.

Measurement apparatus: GPC-150C available from Waters Corporation,
Column: Shodex UT806M available from Showa Denko K.K.,
Column temperature: 135° C.,
Solvent (mobile phase): o-dichlorobenzene,
Solvent flow rate: 1.0 ml/minute,
Sample concentration: 0.1% by weight (dissolved at 135° C. for 1 hour),
Injected amount: 500 µl,
Detector: Differential Refractometer (RI detector) available from Waters Corp., and Calibration curve: Produced from a calibration curve of a single-dispersion, standard polystyrene sample using a predetermined conversion constant.

25 parts by mass of the resultant mixture was charged into a strong-blending, double-screw extruder having an inner diameter of 58 mm and L/D of 52.5, and 75 parts by mass of liquid paraffin was supplied to the double-screw extruder via its side feeder. Melt-blending was conducted at 210° C. and 200 rpm to prepare a polyethylene solution. This polyethylene solution was extruded from a T-die attached to a tip end of the extruder, and the extrudate was slowly cooled at a speed of 10° C./second on a cooling roll controlled at 20° C., thereby providing a gel-like sheet having a thickness of 1.4 mm.

Using a tenter-stretching machine, the gel-like sheet was simultaneously and biaxially stretched at 115° C. as a first stretching step, such that the stretching magnification was 5-fold in both longitudinal direction (MD) and transverse direction (TD). One surface of the stretched membrane was heat-treated on a smooth metal roll controlled at 130° C., such that the contact time was 5 seconds. Fixed to an aluminum frame plate of 20 cm×20 cm, the stretched gel-like sheet was immersed in methylene chloride controlled at 25° C., and washed with the vibration of 100 rpm for 3 minutes. The washed membrane was air-dried at room temperature. Using a batch-type stretching machine, the dried membrane was stretched again to 1.1-fold in a transverse direction (TD) at 120° C. (second stretching). While kept fixed to the batch-type stretching machine, the re-stretched membrane was heat-set at 129.5° C. for 10 minutes to produce a microporous polyethylene membrane.

Example 2

A microporous polyethylene membrane was produced in the same manner as in Example 1 except for using as a heat roll, an electrocast, porous steel sleeve having circular penetrating holes of 0.05 mm in diameter.

Example 3

A microporous polyethylene membrane was produced in the same manner as in Example 1, except that a rough-surface roll constituted by a round wire with 0.2-mm gaps was used as a heat roll, and that the heat-setting temperature was 129° C.

Example 4

A microporous polyethylene membrane was produced in the same manner as in Example 3, except that one surface of the stretched gel-like sheet was heat-treated while being sucked by a heated rough-surface roll constituted by a round wire with 0.2-mm gaps at a suction pressure of 5 kPa.

Example 5

A microporous polyethylene membrane was produced in the same manner as in Example 3, except that one surface of the stretched gel-like sheet was heat-treated by contact for 2 seconds with a heated rough-surface roll constituted by a round wire with 0.2-mm gaps, whose lower portion was immersed in a liquid paraffin bath controlled at 130° C., such that the heated liquid paraffin was held on the roll surface, and that the heat-setting temperature was 128.8° C.

Example 6

A microporous polyethylene membrane was produced in the same manner as in Example 1, except that the temperature of the heat roll (smooth metal roll) was 128° C., that the contact time was 3 seconds, and that the heat-setting temperature was 130.5° C.

Example 7

A microporous polyethylene membrane was produced in the same manner as in Example 1, except that both surfaces of the stretched gel-like sheet were heat-treated by contact with two heated rough-surface rolls respectively (each contact time: 3 seconds), and that the heat-setting temperature was 129.5° C.

Example 8

A microporous polyethylene membrane was produced in the same manner as in Example 1, except that a heat roll (smooth metal roll, diameter: 300 mm) controlled at 125° C. was used, and that the contact time was changed to 1, 3, 5, 7, 10, 25, 30 and 45 seconds, respectively. With respect to the resultant microporous membranes, the relation between the contact time and the area ratio of the coarse-structure layer to the dense-structure layer in a membrane cross section was examined. The results are shown in FIG. 1.

The areas of the dense-structure layer and the coarse-structure layer were measured by the following methods. In a transmission electron photomicrograph (TEM photograph with magnification of 10,000 times) of a vertical cross section of the microporous membrane, a region A extending the entire thickness in a vertical direction and 20 µm in a planar direction was taken. The region A was divided every 2 µm in the thickness direction to provide rectangular regions, and each of five pores in each rectangular region; was measured with respect to the maximum diameter (diameter of the maximum circumscribed circle) and the minimum diameter (diameter of the maximum inscribed circle). They were arithmetically averaged to determine an average pore diameter in each rectangular region. A rectangular region B, in which the average pore diameter was 0.04 µm or less, was regarded as a dense-structure region, and the total area of all the rectangular regions B was regarded as the area of the dense-structure layer. A rectangular region C other than the rectangular region B in the region A was regarded as a coarse-structure region, and the total area of all the rectangular regions C was regarded as the area of the coarse-structure layer.

It is clear from FIG. 1 that the area ratio of the coarse-structure layer to the dense-structure layer in a membrane cross section can be controlled by adjusting the contact time.

Comparative Example 1

A microporous polyethylene membrane was produced in the same manner as in Example 1, except that a polyethylene composition (Mw: $5.0 \times 10^5$, Mw/Mn: 16.0, melting point: 135° C., crystal dispersion temperature: 100° C.) comprising 18% by mass of UHMWPE and 82% by mass of HDPE having Mw of $3.5 \times 10^5$ and Mw/Mn of 13.5 was used, that the polyethylene concentration in the melt blend was 30% by mass, that the first stretching temperature was 116° C., that the heat roll treatment and the second stretching were not conducted, and that the heat-setting temperature was 124° C.

Comparative Example 2

A microporous polyethylene membrane was produced in the same manner as in Example 1, except that the polyethylene concentration in the melt blend was 28% by mass, that the first stretching temperature was 116° C., that the heat roll treatment and the second stretching were not conducted, and that heat-setting temperature was 127° C.

Comparative Example 3

A microporous polyethylene membrane was produced in the same manner as in Example 1, except that the polyethylene concentration in the melt blend was 28% by mass, that the first stretching temperature was 116° C., that the heat roll treatment was not conducted, that the second stretching magnification was 1.05-fold, and that heat-setting temperature was 127° C.

Comparative Example 4

A microporous polyethylene membrane was produced in the same manner as in Example 1, except that the polyethylene concentration in the melt blend was 28% by mass, that the first stretching temperature was 116° C., that the heat roll treatment was not conducted, that the second stretching magnification was 3-fold, and that heat-setting temperature was 130° C.

Comparative Example 5

A microporous polyethylene membrane was produced in the same manner as in Example 1, except that the polyethylene concentration in the melt blend was 28% by mass, that the first stretching temperature was 116° C., that the heat roll treatment and the second stretching were not conducted, and that the heat-setting temperature was 140° C.

The properties of the microporous polyethylene membranes obtained in Examples 1 to 7 and Comparative Examples 1 to 5 were measured by the following methods. The results are shown in Table 1.

(1) Average Thickness (μm)

The thickness of the microporous polyethylene membrane was measured at an arbitrary longitudinal position and at a 5-mm interval over a length of 30 cm in a transverse direction (TD) by a contact thickness meter, and the measured thickness was averaged.

(2) Air Permeability (sec/100 cm³/20 μm)

The air permeability $P_1$ of the microporous polyethylene membrane having a thickness $T_1$ was measured according to JIS P8117, and converted to air permeability $P_2$ at a thickness of 20 μm by the formula of $P_2=(P_1\times 20)/T_1$.

(3) Porosity (%)

It was measured by a mass method.

(4) Pin Puncture Strength (mN/20 μm)

The maximum load was measured when a microporous polyethylene membrane having a thickness $T_1$ was pricked with a needle of 1 mm in diameter with a spherical end surface (radius R of curvature: 0.5 mm) at a speed of 2 mm/second. The measured maximum load $L_1$ was converted to the maximum load $L_2$ at a thickness of 20 μm by the formula of $L_2=(L_1\times 20)/T_1$, which was regarded as pin puncture strength.

(5) Tensile Rupture Strength and Tensile Rupture Elongation

They were measured using a 10-mm-wide rectangular test piece according to ASTM D882.

(6) Heat Shrinkage Ratio (%)

The shrinkage ratio of the microporous polyethylene membrane after exposed to 105° C. for 8 hours was measured three times in both longitudinal direction (MD) and transverse direction (TD) and averaged.

(7) Average Pore Diameter in Dense-Structure Layer and Coarse-Structure Layer

In a transmission electron photomicrograph (TEM photograph with magnification of 10,000 times) of a vertical cross section of the microporous membrane, a region A extending the entire thickness in a vertical direction and 20 μm in a planar direction was taken. The region A was divided every 2 μm in the thickness direction to provide rectangular regions in the total number of 10 to 12 depending on the thickness, and each of five pores in each rectangular region was measured with respect to the maximum diameter (diameter of the maximum circumscribed circle) and the minimum diameter (diameter of the maximum inscribed circle). They were arithmetically averaged to determine an average pore diameter in each rectangular region. A rectangular region B, in which the average pore diameter was 0.04 μm or less, was regarded as a dense-structure region, and the average pore diameters in all the rectangular regions B were arithmetically averaged to determine an average pore diameter in the dense-structure layer. A rectangular region C other than the rectangular region B in the region A was regarded as a coarse-structure region, and the average pore diameters in all the rectangular regions C were arithmetically averaged to determine an average pore diameter in the coarse-structure layer.

(8) Area Ratio of Dense-Structure Layer to Coarse-Structure Layer

The total area of the rectangular regions B determined as described above was regarded as the thickness of the dense-structure layer, and the total area of the rectangular regions C determined as described above was regarded as the thickness of the coarse-structure layer, thereby determining the area ratio expressed by (area of coarse-structure layer)/(area of dense-structure layer).

(9) Average Pore Diameter on Surface 50 pores were arbitrarily selected in a scanning electron photomicrograph (SEM photograph with magnification of 10,000 times) of a heat-roll-treated surface of the microporous membrane, the maximum diameter (the maximum diameter of a circumscribed circle) and the minimum diameter (the maximum diameter of an inscribed circle) were measured on each pore, and arithmetically averaged to obtain an average pore diameter on a surface of the coarse-structure layer.

(10) Ratio of Thickness Change by Heat Compression

A microporous membrane sample was sandwiched by a pair of press plates each having a highly smooth surface, and heat-compressed by a press machine at a pressure of 2.2 MPa (22 kgf/cm²) and 90° C. for 5 minutes to calculate a thickness change ratio, assuming that the pre-compression thickness was 100%.

(11) Post-Compression Air Permeability (sec/100 cm³)

The air permeability of the microporous polyethylene membrane heat-compressed under the above conditions was measured according to JIS P8117, and regarded as "post-compression air permeability."

(12) Electrolytic Solution Absorption Speed

Using a dynamic-surface-tension-measuring apparatus (DCAT21 with high-precision electronic balance, available from Eko Instruments Co., Ltd.), a microporous membrane was immersed for a predetermined period of time in an electrolytic solution (electrolyte: 1 mol/L of $LiPF_6$, solvent: ethylene carbonate/dimethyl carbonate at a volume ratio of 3/7) kept at 18° C., to measure mass increase to calculate the amount of the electrolytic solution absorbed per a sample mass [increment of membrane mass (g)/membrane mass (g) before absorption] as an index of the absorption speed. The electrolytic solution absorption speed is expressed by a relative value, assuming that the absorption speed (g/g) of the membrane of Comparative Example 1 is 1.

TABLE 1

| No. | Example 1 | Example 2 | Example 3 |
|---|---|---|---|
| Polyethylene Composition | | | |
| UHMWPE Mw[(1)]/(Mw/Mn)[(2)]/% by mass | $2.0 \times 10^6$/8/18 | $2.0 \times 10^6$/8/18 | $2.0 \times 10^6$/8/18 |
| HDPE Mw[(1)]/(Mw/Mn)[(2)]/% by mass | $3.0 \times 10^5$/8.6/82 | $3.0 \times 10^5$/8.6/82 | $3.0 \times 10^5$/8.6/82 |
| Production Conditions | | | |
| PE Composition Conc. (% by mass) | 25 | 25 | 25 |
| Thickness (mm) of Gel-Like Sheet | 1.4 | 1.4 | 1.4 |
| First Stretching Temp. (° C.)/(MD × TD)[(3)] | 115/5 × 5 | 115/5 × 5 | 115/5 × 5 |

TABLE 1-continued

| Formation of Coarse-Structure Layer | | | |
|---|---|---|---|
| Roll Type | Smooth | Rough[6] | Rough[7] |
| Number of Rolls | 1 | 1 | 1 |
| Suction Pressure (kPa) | — | — | — |
| Oil | — | — | — |
| Roll Temperature (° C.) | 130 | 130 | 130 |
| Contact Time (second) | 5 | 5 | 5 |
| Second Stretching Temp. (° C.)/Direction/Magnification (fold) | 120/TD/1.1 | 120/TD/1.1 | 120/TD/1.1 |
| Heat-Setting Temp. (° C.)/Time (minute) | 129.5/10 | 129.5/10 | 129/10 |
| Properties | | | |
| Average Thickness (μm) | 22.1 | 20.6 | 21.3 |
| Air Permeability (sec/100 cm$^3$/20 μm) | 275 | 288 | 243 |
| Porosity (%) | 39.2 | 39.7 | 40.7 |
| Pin Puncture Strength (g/20 μm, mN/20 μm) | 477/4,674.6 | 463/4,537.4 | 420/4,116 |
| Tensile Rupture Strength (kg/cm$^2$, kPa) | | | |
| MD | 1,212/118,776 | 1,208/118,384 | 1,055/103,390 |
| TD | 1,105/108,290 | 1,097/107,506 | 1,045/102,410 |
| Tensile Rupture Elongation (%) MD/TD | 173/242 | 167/223 | 188/244 |
| Heat Shrinkage Ratio (%) MD/TD | 2.4/2.1 | 2.3/2.0 | 2.2/1.7 |
| High-Order Structure | | | |
| Surface Having Coarse-Structure Layer | One Surface | One Surface | One Surface |
| Dav[4] (μm) of Coarse-Structure Layer | 0.05 | 0.06 | 0.07 |
| Dav[4] (μm) of Dense-Structure Layer | 0.03 | 0.03 | 0.03 |
| area ratio[5] | 0.3 | 0.3 | 0.3 |
| Dav[4] (μm) on Coarse-Structure Layer Surface | 0.05 | 0.055 | 0.55 |
| Compression Resistance | | | |
| Thickness Variation (%) | −16 | −15 | −15 |
| Post-Compression Air Permeability (sec/100 cm$^3$/20 μm) | 493 | 485 | 455 |
| Electrolytic Solution Absorption Absorbing Speed Ratio | 3.4 | 3.6 | 3.6 |

| No. | Example 4 | Example 5 | Example 6 |
|---|---|---|---|
| Polyethylene Composition | | | |
| UHMWPE Mw[1]/(Mw/Mn)[2]/% by mass | 2.0 × 10$^6$/8/18 | 2.0 × 10$^6$/8/18 | 2.0 × 10$^6$/8/18 |
| HDPE Mw[1]/(Mw/Mn)[2]/% by mass | 3.0 × 10$^5$/8.6/82 | 3.0 × 10$^5$/8.6/82 | 3.0 × 10$^5$/8.6/82 |
| Production Conditions | | | |
| PE Composition Conc. (% by mass) | 25 | 25 | 25 |
| Thickness (mm) of Gel-Like Sheet | 1.4 | 1.4 | 1.4 |
| First Stretching Temp. (° C.)/(MD × TD)[3] | 115/5 × 5 | 115/5 × 5 | 115/5 × 5 |
| Formation of Coarse-Structure Layer | | | |
| Roll Type | Rough/Suction[7] | Rough[7] | Smooth |
| Number of Rolls | 1 | 1 | 1 |
| Suction Pressure (kPa) | 5 | — | — |
| Oil | — | LP[8] | — |
| Roll Temperature (° C.) | 130 | 130 | 128 |
| Contact Time (second) | 5 | 2 | 3 |
| Second Stretching Temp. (° C.)/Direction/Magnification (fold) | 120/TD/1.1 | 120/TD/1.1 | 120//TD/1.4 |
| Heat-Setting Temp. (° C.)/Time (minute) | 129/10 | 128.8/10 | 130.5/10 |
| Properties | | | |
| Average Thickness (μm) | 20.5 | 23.5 | 21.1 |
| Air Permeability (sec/100 cm$^3$/20 μm) | 285 | 237 | 285 |
| Porosity (%) | 39 | 40.1 | 41.2 |
| Pin Puncture Strength (g/20 μm, mN/20 μm) | 481/4,713.8 | 413/4,047.4 | 495/4,851 |
| Tensile Rupture Strength (kg/cm$^2$, kPa) | | | |
| MD | 1,220/119,560 | 1,045/102,410 | 1,220/119,560 |
| TD | 1,110/108,780 | 1,032/101,136 | 1,120/109,760 |
| Tensile Rupture Elongation (%) MD/TD | 170/240 | 165/255 | 175/210 |
| Heat Shrinkage Ratio (%) MD/TD | 2.5/2.2 | 2.7/2.3 | 2.3/2.8 |

TABLE 1-continued

| High-Order Structure | | | |
|---|---|---|---|
| Surface Having Coarse-Structure Layer | One Surface | One Surface | One Surface |
| Dav[(4)] (μm) of Coarse-Structure Layer | 0.06 | 0.09 | 0.07 |
| Dav[(4)] (μm) of Dense-Structure Layer | 0.03 | 0.03 | 0.04 |
| area ratio[(5)] | 0.2 | 0.3 | 0.3 |
| Dav[(4)] (μm) on Coarse-Structure Layer Surface | 0.05 | 0.07 | 0.055 |
| Compression Resistance | | | |
| Thickness Variation (%) | −15 | −16 | −19 |
| Post-Compression Air Permeability (sec/100 cm$^3$/20 μm) | 571 | 445 | 495 |
| Electrolytic Solution Absorption Absorbing Speed Ratio | 2.7 | 3.5 | 2.9 |

| No. | Example 7 | Comp. Ex. 1 | Comp. Ex. 2 |
|---|---|---|---|
| Polyethylene Composition | | | |
| UHMWPE Mw[(1)]/(Mw/Mn)[(2)]/% by mass | $2.0 \times 10^6$/8/18 | $2.0 \times 10^6$/8/18 | $2.0 \times 10^6$/8/18 |
| HDPE Mw[(1)]/(Mw/Mn)[(2)]/% by mass | $3.0 \times 10^5$/8.6/82 | $3.5 \times 10^5$/13.5/82 | $3.0 \times 10^5$/8.6/82 |
| Production Conditions | | | |
| PE Composition Conc. (% by mass) | 25 | 30 | 28 |
| Thickness (mm) of Gel-Like Sheet | 1.4 | 1.4 | 1.4 |
| First Stretching Temp. (° C.)/(MD × TD)[(3)] | 115/5 × 5 | 116/5 × 5 | 116/5 × 5 |
| Formation of Coarse-Structure Layer | | | |
| Roll Type | Smooth | — | — |
| Number of Rolls | 2 | — | — |
| Suction Pressure (kPa) | — | — | — |
| Oil | — | — | — |
| Roll Temperature (° C.) | 128 | — | — |
| Contact Time (second) | 3 sec.[(9)] | — | — |
| Second Stretching Temp. (° C.)/Direction/Magnification (fold) | 120/TD/1.1 | —/—/— | —/—/— |
| Heat-Setting Temp. (° C.)/Time (minute) | 129.5/10 | 124/10 | 127/10 |
| Properties | | | |
| Average Thickness (μm) | 20.6 | 20.1 | 20.8 |
| Air Permeability (sec/100 cm$^3$/20 μm) | 288 | 532 | 545 |
| Porosity (%) | 38.9 | 35.9 | 37.5 |
| Pin Puncture Strength (g/20 μm, mN/20 μm) | 406/3,978.8 | 475/4,655 | 594/5,821.2 |
| Tensile Rupture Strength (kg/cm$^2$, kPa) | | | |
| MD | 1,055/103,390 | 1,516/148,568 | 1,871/183,358 |
| TD | 1,095/107,310 | 1,253/122,974 | 1,490/146,020 |
| Tensile Rupture Elongation (%) MD/TD | 177/244 | 159/260 | 138/241 |
| Heat Shrinkage Ratio (%) MD/TD | 2.2/2.1 | 6.1/4.5 | 6.2/5.7 |
| High-Order Structure | | | |
| Surface Having Coarse-Structure Layer | Both Surfaces | — | — |
| Dav[(4)] (μm) of Coarse-Structure Layer | 0.07 | — | — |
| Dav[(4)] (μm) of Dense-Structure Layer | 0.04 | 0.03 | 0.03 |
| area ratio[(5)] | 0.6 | — | — |
| Dav[(4)] (μm) on Coarse-Structure Layer Surface | 0.05 | 0.03[(10)] | 0.025[(10)] |
| Compression Resistance | | | |
| Thickness Variation (%) | −15 | −11 | −11 |
| Post-Compression Air Permeability (sec/100 cm$^3$/20 μm) | 425 | 1,120 | 1,095 |
| Electrolytic Solution Absorption Absorbing Speed Ratio | 3.8 | 1 | 1 |

| No. | Comp. Ex. 3 | Comp. Ex. 4 | Comp. Ex. 5 |
|---|---|---|---|
| Polyethylene Composition | | | |
| UHMWPE Mw[(1)]/(Mw/Mn)[(2)]/% by mass | $2.0 \times 10^6$/8/18 | $2.0 \times 10^6$/8/18 | $2.0 \times 10^6$/8/18 |
| HDPE Mw[(1)]/(Mw/Mn)[(2)]/% by mass | $3.0 \times 10^5$/8.6/82 | $3.0 \times 10^5$/8.6/82 | $3.0 \times 10^5$/8.6/82 |
| Production Conditions | | | |
| PE Composition Conc. (% by mass) | 28 | 28 | 28 |
| Thickness (mm) of Gel-Like Sheet | 1.4 | 1.4 | 1.4 |

TABLE 1-continued

| | | | |
|---|---|---|---|
| First Stretching Temp. (° C.)/(MD × TD)[3] | 116/5 × 5 | 116/5 × 5 | 116/5 × 5 |
| Formation of Coarse-Structure Layer | | | |
| Roll Type | — | — | — |
| Number of Rolls | — | — | — |
| Suction Pressure (kPa) | — | — | — |
| Oil | — | — | — |
| Roll Temperature (° C.) | — | — | — |
| Contact Time (second) | — | — | — |
| Second Stretching Temp. (° C.)/Direction/Magnification (fold) | 120/TD/1.05 | 120/TD/3 | —/—/— |
| Heat-Setting Temp. (° C.)/Time (minute) | 127/10 | 130/10 | 140/10 |
| Properties | | | |
| Average Thickness (μm) | 20.2 | 19.6 | — |
| Air Permeability (sec/100 cm³/20 μm) | 495 | 277 | No permeability |
| Porosity (%) | 38.6 | 43.5 | — |
| Pin Puncture Strength (g/20 μm, mN/20 μm) | 605/5,929 | 621/6,085.8 | —/— |
| Tensile Rupture Strength (kg/cm², kPa) | | | |
| MD | 1,796/176,008 | 1,712/167,776 | —/— |
| TD | 1,560/152,880 | 1,660/162,680 | —/— |
| Tensile Rupture Elongation (%) MD/TD | 135/223 | 125/185 | —/— |
| Heat Shrinkage Ratio (%) MD/TD | 6/6.2 | 5.8/11.5 | —/— |
| High-Order Structure | | | |
| Surface Having Coarse-Structure Layer | — | — | — |
| Dav[4] (μm) of Coarse-Structure Layer | — | — | — |
| Dav[4] (μm) of Dense-Structure Layer | 0.03 | 0.03 | — |
| area ratio[5] | — | — | — |
| Dav[4] (μm) on Coarse-Structure Layer Surface | 0.03[10] | 0.05[10] | — |
| Compression Resistance | | | |
| Thickness Variation (%) | −13 | −28 | — |
| Post-Compression Air Permeability (sec/100 cm³/20 μm) | 995 | 496 | — |
| Electrolytic Solution Absorption Absorbing Speed Ratio | 1.2 | 1.5 | — |

Note:
[1]Mw represents a mass-average molecular weight.
[2]Mw/Mn represents a molecular weight distribution.
[3]MD represents a longitudinal direction, and TD represents a transverse direction.
[4]Dav represents an average pore size.
[5]The area ratio of the coarse-structure layer to the dense-structure layer.
[6]An electrocast, porous steel sleeve having circular penetrating holes of 0.05 mm in diameter.
[7]A porous round wire with 0.2-mm gaps.
[8]A liquid paraffin (LP) was added.
[9]The contact time was 3 seconds on each surface of the stretched membrane.
[10]The average pore diameter of the dense-structure layer surface.

It is clear from Table 1 that because the area ratio of the coarse-structure layer to the dense-structure layer in a membrane cross section was 0.1 to 0.8 in each microporous polyethylene membrane of Examples 1 to 7 comprising a coarse-structure layer having an average pore diameter of more than 0.04 μm and a dense-structure layer having an average pore diameter of 0.04 μm or less, the microporous polyethylene membrane had excellent compression resistance (deformability when compressed and permeability after compression), permeability, mechanical properties and heat shrinkage resistance as well as a high electrolytic solution absorption speed.

On the other hand, each membrane of Comparative Examples 1 to 4 did not have a multi-layer structure comprising a coarse-structure layer and a dense-structure layer, because the stretched gel-like sheet was not brought into contact with a heat roll. Accordingly, it had a lower electrolytic solution absorption speed and poorer heat shrinkage resistance than those of Examples 1 to 7. Particularly Comparative Examples 1 to 3 had poorer air permeability, and smaller thickness change and larger air permeability change by compression than those of Examples 1 to 7. Comparative Example 5 did not have permeability, because the heat-setting treatment was not conducted at a temperature exceeding the melting point.

EFFECT OF THE INVENTION

The microporous polyethylene membrane of this invention has small air permeability change by compression, a high electrolytic solution absorption speed, and excellent deformability, mechanical properties, permeability and heat shrinkage resistance. The use of the microporous polyethylene membrane of this invention for a separator provides a battery with particularly improved productivity and safety properties. This invention can produce the microporous polyethylene membrane having a gradient structure comprising a coarse-structure layer and a dense-structure layer easily at a low cost. The ratio of the coarse-structure layer to the dense-structure layer and the pore size of the coarse-structure layer can also be controlled easily.

What is claimed is:

1. A microporous polyethylene membrane made of a polyethylene resin having a ratio (mass-average molecular weight/number-average molecular weight) of 5 to 300 and comprising 1% or more by mass of ultra-high-molecular-weight polyethylene having a mass-average molecular weight of $7 \times 10^5$ or more, the microporous polyethylene membrane comprising (a) a dense-structure layer having an average pore diameter of 0.04 μm or less, and (b) a coarse-structure layer having an average pore diameter of 0.05 μm or more, wherein said coarse-structure layer is formed on at least one surface of said dense-structure layer, an area ratio of the coarse-structure layer to the dense-structure layer in a membrane cross section being 0.1 to 0.8.

* * * * *